US006843925B2

United States Patent
Bonelli et al.

(10) Patent No.: US 6,843,925 B2
(45) Date of Patent: Jan. 18, 2005

(54) METHOD FOR STABILIZING CHLORINE IN AQUEOUS SOLUTION

(75) Inventors: Jonathan J. Bonelli, New York, NY (US); Matt Cowdell, Holtsville, NY (US); Mitchell Saccoccio, Lake Ronkonkoma, NY (US)

(73) Assignee: Stealth Industries Ltd., Kowloon (HK)

( * ) Notice: Subject to any disclaimer, the term of this patent is extended or adjusted under 35 U.S.C. 154(b) by 67 days.

(21) Appl. No.: 10/328,240

(22) Filed: Dec. 23, 2002

(65) Prior Publication Data

US 2004/0118787 A1 Jun. 24, 2004

(51) Int. Cl.$^7$ .................................................. C02F 1/76
(52) U.S. Cl. ...................... 210/752; 210/755; 210/764; 422/37
(58) Field of Search ................................ 210/752, 755, 210/754, 756, 764; 422/37

(56) References Cited

U.S. PATENT DOCUMENTS

| 3,996,225 A | * | 12/1976 | Gray et al. ................. 544/192 |
| 4,389,318 A | * | 6/1983 | Wojtowicz ................... 210/755 |
| 4,423,216 A | * | 12/1983 | Wojtowicz et al. ......... 544/192 |
| 4,943,674 A | * | 7/1990 | Houck et al. ............... 800/287 |
| 5,223,551 A | | 6/1993 | Gattuso et al. ............. 521/163 |
| 5,225,074 A | | 7/1993 | Moini ........................ 210/169 |
| 5,567,283 A | * | 10/1996 | Lynn et al. .............. 204/228.6 |
| 5,662,795 A | | 9/1997 | Pickens et al. ............. 210/169 |
| 5,688,515 A | | 11/1997 | Kuechler et al. ........... 428/408 |
| 5,888,386 A | | 3/1999 | Enright et al. .............. 210/169 |
| 5,888,939 A | * | 3/1999 | Jones et al. ................. 504/155 |
| 6,207,048 B1 | * | 3/2001 | Bonelli .................... 210/198.1 |

* cited by examiner

Primary Examiner—Peter A. Hruskoci
(74) Attorney, Agent, or Firm—Dilworth & Barrese LLP

(57) ABSTRACT

An isocyanurate stabilizer to the chlorinated pool water includes a tablet of chemically pure isocyanuric acid soluble in the pool water before a chlorinated tablets are added into the pool water.

13 Claims, 1 Drawing Sheet

METHOD FOR STABILIZING CHLORINE IN AQUEOUS SOLUTION

BACKGROUND OF THE INVENTION

1. Field of the Invention

The present invention relates to a method for stabilizing an aqueous solution containing a chlorine-based oxidant, and more particularly, to a method for stabilizing an aqueous solution containing a chlorine-based oxidant by pre-treating the aqueous solution with pure isocyanuric acid in the form of tablets.

2. Description of the Prior Art

Chlorine, hypochlorous acid, salts thereof, chlorinated isocyanuric acids, chlorinated hydantoins and other chlorine compounds (which are hereafter collectively referred to as chlorine-based oxidants) are known to achieve very effective and quick control of aquatic growth (including bacteria) even if they are used in low concentrations. Because of their high oxidizing activity, these oxidants are used in waterworks as a sterilizer, in chemical plants and cooling towers as a sterilizer or algicide for circulated cooling water, in pulp mills as a slime control agent, and in swimming pools as a disinfectant.

However, the chlorine-based oxidants in aqueous solutions do not have a long keeping quality; their oxidizing ability decreases even if they are stored at ordinary temperatures, and they decompose even faster by the effect of heat, light and agitating force. Thus, if regular maintenance and constant water quality are not ensured, the intended effect of the chlorine-based oxidants is lost in a very short time and may completely fail.

Another reason for the failure of the chlorination may be that the active chlorine is bound by a variety of organic substances and thus becomes inactive. The excess chlorine remaining after bactericidal action is slowly lost, so that a proportioned addition of chlorine is required continuously.

The addition of chlorine also is disadvantageous since the taste of the water is adversely affected and can lead to the irritations of the mucous membranes. Moreover, recent studies have suggested that carcinogenic substances are produced by the addition of chlorine. However, in order to keep swimming pool water clear and free of unwanted biological growth, measured amounts of chlorine are commonly added to pool water at given intervals.

One common method of making chlorine additions is to add chlorine in the form of dry, granular calcium hypochlorite on a daily basis in a measured dose depending on the size of the pool. In order to make the task of adding chlorine easier for the pool owner, and to extend the life of the chlorine, it is common to add an isocyanurate stabilizer to the chlorinated pool water to prevent the usual rapid dissipation of chlorine, which is caused by ultraviolet light degradation to thus permit less frequent chlorine additions.

To accomplish this, chlorine has also been formulated into a slow-acting tablet form, commonly referred to as stabilized concentrated chlorinating tablets, which may conveniently allows chlorine additions on a weekly basis. A composition of tablets may consist of a mixture in compressed form of trichloroisocyanuric acid, as disclosed in U.S. Pat. No. 4,389,318, fully incorporated herein by reference. While stabilized chlorinating tablets offer a significant convenience in the maintenance of pool water, they, likewise, possess an inherent shortcoming. Commonly used isocyanurate stabilizers form isocyanuric acid in the pool water, also known as fulminuric acid.

It is observed that the isocyanuric acid concentration continues to increase in the pool water as additional isocyanurate stabilizers are added over a period of time. When the isocyanuric acid concentration in the pool water reaches a level of about 100 parts per million (PPM), a so-called "chlorine lock" occurs which renders further chlorine additions as ineffective. This condition is easily detected by way of a known pool water test wherein a conventional isocyanuric reagent turns progressively foggy within prescribed limits.

When such a chlorine lock occurs, it is common practice to drain the saturated pool water and replace it with fresh water. Of course, continued isocyanurate stabilizer additions eventually cause a similar chlorine lock to occur in the replaced water which requires yet another drain and replacement. Needless to say, this conventional practice of correcting the chlorine lock problem due to accumulated isocyanuric acid is not only inconvenient to the pool owner, requiring pool shut down, but also is expensive with respect to the high cost of replacement water which in a typical swimming pool may be on the order of about 30,000 gallons, for example.

To minimize regular addition of isocyanurate stabilizers as part of a compacted mixture including chlorine, it was suggested that isocyanuric acid be placed in the pool in granular form before the tablets are added.

One of the methods of creating a residual level of isocyanurate stabilizers in swimming pools is to simply pour granulated isocyanuric acid in the pool water. Since isocyanuric acid is not easily soluble, it tends to deposit on the bottom of the pool and to look like unwanted debris. The pool owner seeing his/her pool full of undesirable substance and not typically realizing that this is just granules to be soled in time undertakes usual steps directed to cleaning the pool and including vacuuming.

Another method of dispensing isocyanurate stabilizers is to place isocyanuric acid directly in a skimmer. Since granules are not easily dissolved, they tend to temporarily clog a pump. The pool owner alarmed by an increase of pressure indicated by a pressure gauge typically backwashes the skimmer, which leads to the result analogous to the one disclosed immediately above.

It is, therefore, desirable to provide a chlorine stabilizer that can be dissolved in pool water in a relatively short time and to provide a residual level of isocyanuric acid sufficient to prevent the reduction of the residual chlorine with an elapse of time.

OBJECTS OF THE INVENTION

It is an object of the present invention to provide a new method of pre-treating pool water employing a rapidly dissolving composition, which contains pure isocyanuric acid, to create a residual level of isocyanuric acid sufficient to stabilize chlorine for a prolonged period of time.

Still another object of the invention is to provide isocyanuric acid compacted in tablet form, which is concentrated so that the residual level of isocyanuric acid is sufficient to prevent the reduction of the residual chlorine within a substantial period of time.

Yet a further object of the invention is to provide a plurality of fine particles of isocyanuric acid compressed in tablet form and dimensioned to rapidly dissolve in water.

SUMMARY OF THE INVENTION

In accordance with the invention, a method for treating water in pool establishes a sufficient residual level of isocyanuric acid by placing an effective amount of isocyanuric acid in a skimmer for a predetermined period of time before adding chlorine tablets to the pool water.

As a result of the inventive step, a residual level of chlorine stabilizer formed in the pool water is sufficient to significantly minimize a rate at which the chlorine leaves the pool water.

A further object of the invention includes providing a tablet formed by compressing fine particles of isocyanuric acid rapidly dissolved in water.

One of the advantages of such a tablet, is that fine particles of isocyanuric acid are so dimensioned that by implementing the inventive method the particles neither clog the filter nor cover the bottom of the pool with a visual layer.

In accordance with a further object of the invention, a kit containing the inventive tablets, which are placed in predetermined quantities sufficient to maintain the desired residual level of chlorine stabilizer during a predetermined period of time, is provided.

Using the inventive kit, pool owners are offered the convenience of adding the chlorine stabilizer in predetermined quantities during the season without making otherwise obligatory trips to stores every time the pool water needs to be treated.

BRIEF DESCRIPTION OF DRAWINGS

The above and other objects, features, and advantages will become more readily apparent from a further detailed description accompanied by a sole FIGURE in which a kit containing a combination of the inventive tablets is isometrically illustrated.

SPECIFIC DESCRIPTION

Figure 1:
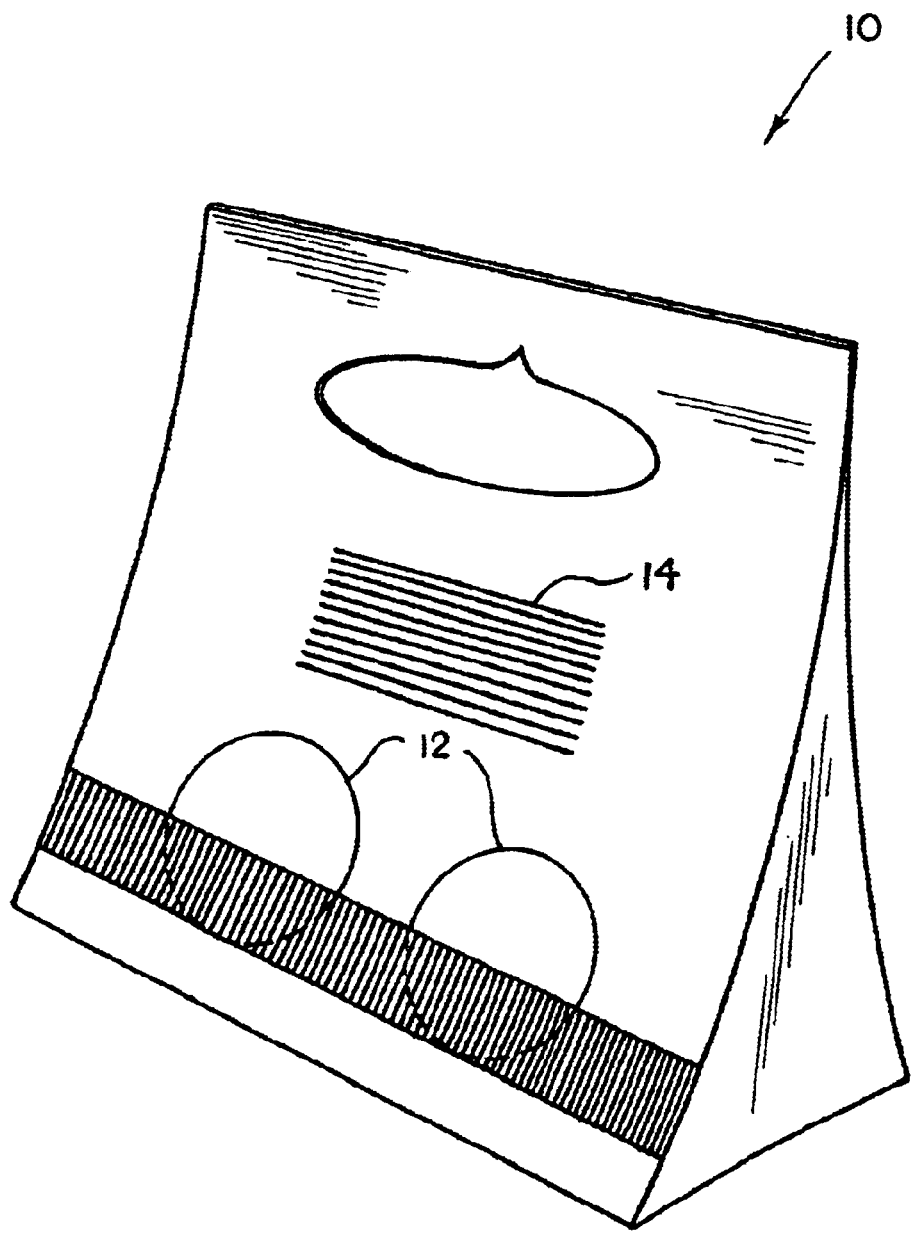

Isocyanuric acid (HNCO) has achieved commercial importance mainly via its derivatives. N-chlorination of cyanuric acid produces products that have gained wide acceptance in swimming pool disinfection. Since solubilization of isocyanuric acid is slow, enhancement of solubility is frequently achieved through salt formation. The N-chloro derivatives of isocyanuric acid are the most important commercial products which have become standard ingredients in swimming pool disinfection. The choice of the N-chloroisocyanurate for any particular application depends on the desired combination of solubility, available chlorine content, and pH. Trichloroisocyanuric acid (TCCA) is highest in available chlorine content and is slow to dissolve. This slow rate of TCCA dissolution is used as an advantage in pool sanitizing where it is tabletted along with chlorine and then dispensed in the water filtration system. Also, dichloroisocyanuric acid can be utilized for pool sanitizing purposes.

However, in time, isocyanuric acid constituting a portion of tablet dissolves and fails to prevent chlorine from leaving the pool water due to such meteorological conditions as rain and heat as well as due to the periodic maintenance of the pool. To counteract sunlight (ultraviolet) destruction of available chlorine in swimming pools, isocyanuric acid is used as a stabilizer. Since isocyanuric acid is the by-product of N-chloroisocyanurate usage, available chlorine stabilization is affected by pool sanitation treatments combining an initial CA charge with continued use of the various N-chloroisocyanurates. Because isocyanuric acid is sold as a coarse granulate, minimum of about 0.14–2 mm, the problems encountered by the pool owners, as discussed above, arise.

In accordance with the invention, to maintain an effective CA charge level, chemically pure isocyanuric acid is tabletted. The tablet 10 contains fine granules each being about 10–30 mesh, which is substantially smaller than the commercially available coarse granules. In a preferred embodiment of the invention, the tablet is about 5" in diameter.

The tablet is used in association with the inventive method which requires adjusting pH of pool water to approximately 7.2–7.6 and, upon backwashing a filter or cleaning cartridge, placing the tablet 10 in a skimmer so as to expose it to a continuous stream of water generated by a pump.

It is imperative that water circulate for 10–12 hours to provide dissolution of the tablet without clogging the filter and without covering the bottom of the pool with a layer of acid particles. Preferably, the pool water is treated to yield a controlled isocyanuric acid concentration of between about 25–70 PPM. Advantageously, the acid concentration varies between about 30–40 PPM.

Preferably, the filter is not backwashed for next 30–36 hours. Thus, the overall procedure establishing a sufficient residual level in pool water takes approximately 48 hours. Based on empirical data, the tablet 10 of the present invention, if used in accordance with the inventive method, creates the desired residual level of stabilizer sufficient to minimize the chlorine's escape for at least two moths regardless of the frequency at which chlorine and/or chlorine-based additives are added to pool water.

It was found particularly advantageous to provide a combination of two tablets 12 assembled in a kit 10, which may contain either a single compartment receiving both tablets 10 or two separate compartments. The kit is provided with clear instructions 14 assisting the pool owners in maintaining the desired concentration of stabilizer, which protects quality of pool water for a prolonged period of time.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

What is claimed is:

1. A method for treating swimming pool water, comprising the steps of:

forming a tablet containing an effective amount of chemically pure isocyanuric acid and separately adding chlorine to the pool water apart from the tablet of isocyanuric acid, wherein said tablet creates a residual level of isocyanuric acid in said pool water to stabilize said chlorine;

dissolving the tablet in pool water to create a desired concentration of isocyanuric acid to establish a desired residual level of concentration of isocyanuric acid in the pool water.

2. The method of claim 1, wherein the step of dissolving includes placing the tablet in a continuous stream of water circulating in the pool.

3. The method of claim 2, wherein the tablet is placed in a skimmer of the pool.

4. The method of claim 2, comprising the step of exposing the thus-formed tablet to the circulating water for about 10–12 hours.

5. The method of claim 4, comprising the additional steps of backwashing a filter or cleaning cartridge prior to exposing the thus-formed tablet to the circulating water, and not backwashing the filter or cartridge for about 30–36 hours after exposing of the tablet to the circulating water has been completed.

6. The method of claim 4, comprising the additional step of adding first-stabilized chlorinating tablets or chloroisocyanurates upon termination of a dissolving period of time.

7. The method of claim 1, wherein the step of forming the tablet includes compressing the fine granules of about 10–30 mesh into the tablet.

8. The method of claim 7, comprising the additional step of forming the tablet about 5 inches in diameter.

9. The method of claim 1, comprising the additional step of adjusting pH of the pool water before dissolving the tablet therein.

10. The method of claim 9, wherein the pool water is adjusted to pH of approximately 7.2–7.6.

11. The method of claim 1, comprising the step of treating the pool water to yield a controlled concentration of isocyanuric acid between about 25–70 ppm.

12. The method of claim 11, wherein the pool water is treated to yield a desired residual level of the isocyanuric acid between about 30–40 ppm.

13. The method of claim 1, comprising the additional step of periodically adding subsequent stabilized chlorinating tablets or chloroisocyanurates upon establishing a desired residual level of concentration of the isocyanuric acid in the pool water.

* * * * *